US 6,725,402 B1

(12) United States Patent
Coss, Jr. et al.

(10) Patent No.: US 6,725,402 B1
(45) Date of Patent: Apr. 20, 2004

(54) METHOD AND APPARATUS FOR FAULT DETECTION OF A PROCESSING TOOL AND CONTROL THEREOF USING AN ADVANCED PROCESS CONTROL (APC) FRAMEWORK

(75) Inventors: Elfido Coss, Jr., Austin, TX (US); Qingsu Wang, Austin, TX (US); Terrence J. Riley, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 556 days.

(21) Appl. No.: 09/629,073

(22) Filed: Jul. 31, 2000

(51) Int. Cl.[7] ................................................. G06F 11/00
(52) U.S. Cl. ........................... 714/48; 700/109; 700/95; 714/742
(58) Field of Search ............................. 714/4, 48, 742; 700/109, 139, 95; 438/14

(56) References Cited

U.S. PATENT DOCUMENTS

| | | | | |
|---|---|---|---|---|
| 5,661,669 A | | 8/1997 | Mozumder et al. ......... 364/552 |
| 5,740,062 A | | 4/1998 | Berken et al. ......... 364/478.06 |
| 5,859,964 A | | 1/1999 | Wang et al. ............ 395/185.01 |
| 6,061,640 A | * | 5/2000 | Tanaka et al. ................. 702/81 |
| 6,115,643 A | * | 9/2000 | Stine et al. .................. 700/110 |
| 6,161,054 A | * | 12/2000 | Rosenthal et al. .......... 700/121 |
| 6,232,134 B1 | * | 5/2001 | Farber et al. ................... 438/9 |
| 6,263,255 B1 | * | 7/2001 | Tan et al. .................... 700/121 |
| 6,314,385 B1 | * | 11/2001 | Kim et al. ................... 702/184 |
| 6,315,574 B1 | * | 11/2001 | Kamieniecki et al. ........ 439/16 |
| 6,336,055 B1 | * | 1/2002 | Cho ............................ 700/121 |
| 6,408,399 B1 | * | 6/2002 | Baughman ..................... 714/4 |
| 6,532,555 B1 | * | 3/2003 | Miller et al. ................... 714/48 |
| 6,546,508 B1 | * | 4/2003 | Sonderman et al. .......... 714/48 |
| 6,556,881 B1 | * | 4/2003 | Miller ......................... 700/108 |
| 6,606,582 B1 | * | 8/2003 | Brinkman et al. ........... 702/188 |

FOREIGN PATENT DOCUMENTS

| | | | |
|---|---|---|---|
| WO | WO 01/18623 A1 | 3/2001 | ......... G05B/19/418 |
| WO | WO 01/25865 A1 | 4/2001 | ......... G05B/19/418 |

OTHER PUBLICATIONS

International PCT Search Report dated July 3, 2001 (PCT/US01/21159; TT3217-PCT).

* cited by examiner

Primary Examiner—Scott Baderman
Assistant Examiner—Anne L. Damiano
(74) Attorney, Agent, or Firm—Williams, Morgan & Amerson, P.C.

(57) ABSTRACT

A method and apparatus for providing fault detection in an Advanced Process Control (APC) framework. A first interface receives operational state data of a processing tool related to the manufacture of a processing piece. The state data is sent from the first interface to a fault detection unit. A fault detection unit determines if a fault condition exists with the processing tool based upon the state data. A predetermined action is performed on the processing tool in response to the presence of a fault condition. In accordance with one embodiment, the predetermined action is to shutdown the processing tool so as to prevent further production of faulty wafers.

17 Claims, 5 Drawing Sheets

METHOD AND APPARATUS FOR FAULT DETECTION OF A PROCESSING TOOL AND CONTROL THEREOF USING AN ADVANCED PROCESS CONTROL (APC) FRAMEWORK

BACKGROUND OF THE INVENTION

1. Field of the Invention

This invention relates generally to semiconductor fabrication technology, and, more particularly, to a method and apparatus for fault detection and control of a processing tool using an Advanced Process Control (APC) framework.

2. Description of the Related Art

There is a constant drive in the semiconductor industry to increase the quality, reliability, and throughput of integrated circuit devices such as microprocessors, memory devices and the like. This drive is fueled by consumer demands for higher quality computers and electronic devices that operate more reliably.

These demands by the consumer have resulted in some improvements in the manufacture of semiconductor devices as well as in the manufacture of integrated circuit devices incorporating such semiconductor devices. Reducing defects in the manufacture of these devices lowers the cost of the devices themselves. Accordingly, the cost of the final product incorporating these devices is also reduced, thus providing inherent monetary benefits to both the consumer and manufacturer.

Although there has been an improvement in detecting faults associated with semiconductor manufacturing processes, one problem currently encountered by the semiconductor manufacturing industry is the delay in reporting these faults such that corrective measures can be implemented in a more expedient manner. As a result of this delay, several faulty devices are produced, which undesirably increases costs for the manufacturer and consumer.

The present invention is directed to overcoming, or at least reducing the effects of, one or more of the problems set forth above.

SUMMARY OF THE INVENTION

In one aspect of the present invention, a method is provided for fault detection in a manufacturing process. The method includes receiving at a first interface operational state data of a processing tool related to the manufacture of a processing piece. The state data is sent from the first interface to a fault detection unit. It is determined if a fault condition exists with the processing tool based upon the state data, and a predetermined action is performed on the processing tool in response to the presence of a fault condition.

In another aspect of the present invention, a system is provided for fault detection in a manufacturing process. The system includes a processing tool adapted to manufacture a processing piece and a first interface, coupled to the processing tool, which is adapted to receive operational state data of the processing tool related to the manufacture of the processing piece. The system further includes a fault detection unit adapted to determine if a fault condition exists with the processing tool based on the operational state data, and a framework adapted to perform a predetermined action on the processing tool in response to the presence of a fault condition.

BRIEF DESCRIPTION OF THE DRAWINGS

The invention may be understood by reference to the following description taken in conjunction with the accompanying drawings, in which like reference numerals identify like elements, and in which.

Figure 1:
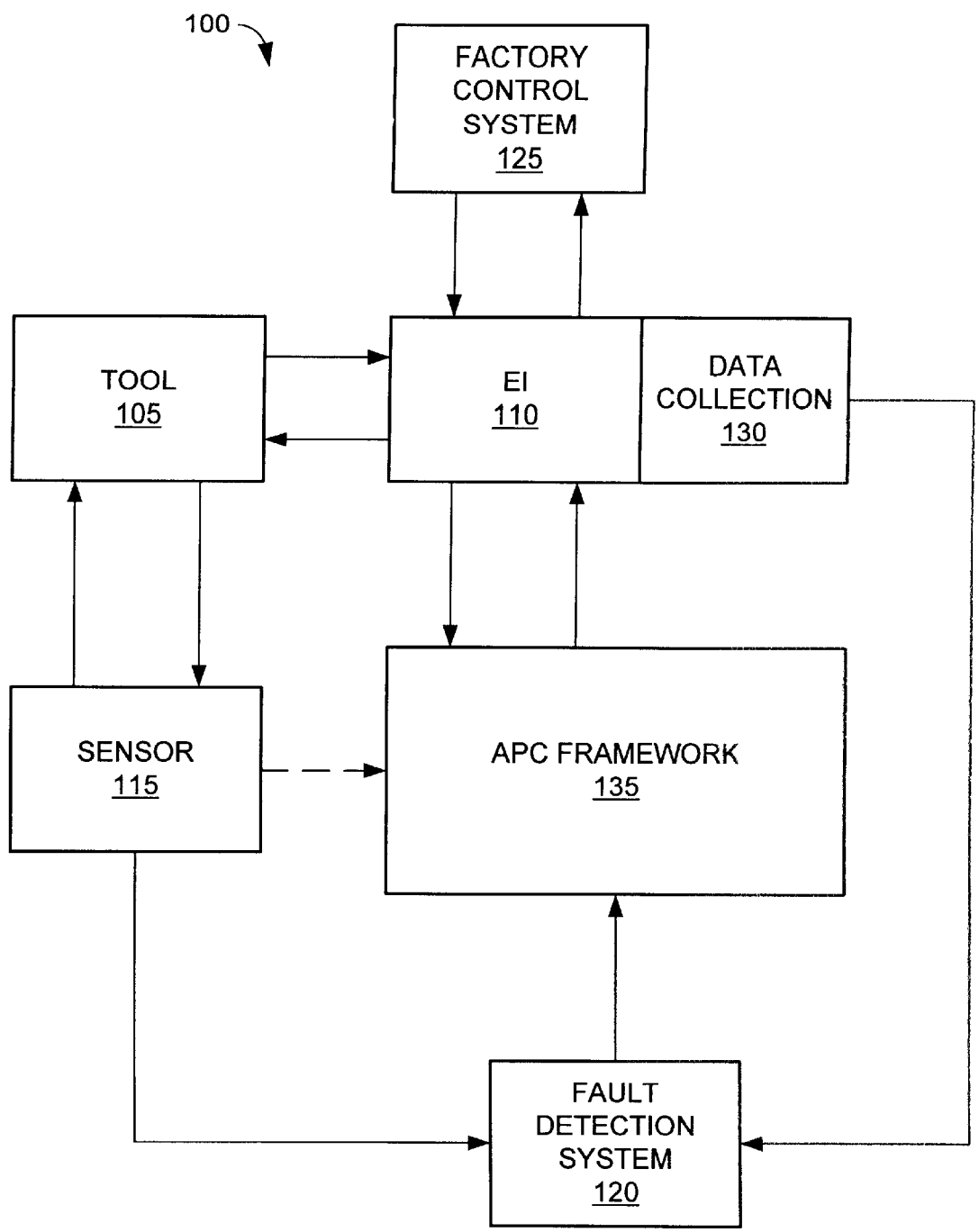
FIG. 1. illustrates a manufacturing system that includes a fault detection system and Advanced Process Control (APC) framework for providing fault detection and control of a processing tool in accordance with one embodiment.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a system 100 for determining fault detection in a semiconductor fabrication process based on process tool operational state data is provided. The system 100 includes a processing tool 105, which in the illustrated embodiment, is in the form of semiconductor fabrication equipment used to produce a processing piece, such as a silicon wafer. The processing tool 105, in accordance with one embodiment, is an Applied Materials (AMAT) Rapid Thermal Processing (RTP) tool. It will be appreciated, however, that the processing tool 105 need not necessarily be limited to an AMAT RTP tool, or even to a tool for processing silicon wafers, but could include other types of manufacturing equipment for producing a variety of different types of commercial products without departing from the spirit and scope of the present invention.

The processing tool 105 is coupled to an equipment interface (EI) 110, which retrieves various tool state data from the tool 105, and communicates this data to a fault detection system 120 via the data collection unit 130 to determine whether the tool 105 is experiencing a faulty operation. The tool state data may include, but is not necessarily limited to, temperature, pressure, and gas flow measurements of the processing tool 105.

An add-on sensor 115 may also be coupled to the processing tool 105 to measure additional tool state data that is not ascertained by the tool 105 itself. For example, the add-on sensor 115 may be used to determine whether the silicon wafer was produced within acceptable operational limits by the tool 105. Such acceptable operational limits of the tool 105 may be to produce the wafer within a certain temperature range, for example. It will be appreciated, however, that the add-on sensor 115 may be used to record various other operational state parameters, and, thus, need not be limited to the aforementioned example.

The sensor 115 may be embodied as a simple data acquisition program, such as a C++ standalone program acquiring data from a thermocouple wire, for example. Alternatively, the sensor 115 may be embodied as a full-fledged LABVIEW® application, acquiring data through multiple transducers (not shown). It will further be appreciated that the sensor 115 need not be used at all, and the fault detection system 120 could rely solely upon the tool state data forwarded from the equipment interface 110. If used, however, the sensor 115 forwards the additional tool state data to the fault detection system 120 for analysis.

A factory control system 125, such as WorkStream, for example, provides overall program control of the semiconductor fabrication process performed by the system 100. The control system 125 provides signals to the equipment interface 110 to control the processing tool 105, such as starting and stopping the operation of the tool 105, for example. When the tool 105 is operating and processing a given wafer, the tool state data is received by the equipment interface 110 and collected by a data collection unit 130 as the data is sent from the processing tool 105 while the particular wafer is being processed. The data collection unit 130 converts the tool state data into a tool data file for the particular wafer being processed, and forwards the file to the fault detection system 120 for analysis in near real-time. In one embodiment, if the process is long, the process may be broken up into parts. The data collection unit 130, when converting the tool state data into a tool data file, translates this data from a first communications protocol used by the equipment interface 110 to a second communications protocol compatible with a software running on the fault detection system 120. The process for translating the tool state data into tool data files is specific to the particular fault detection software that is operating on the fault detection system 120.

Figure 2:
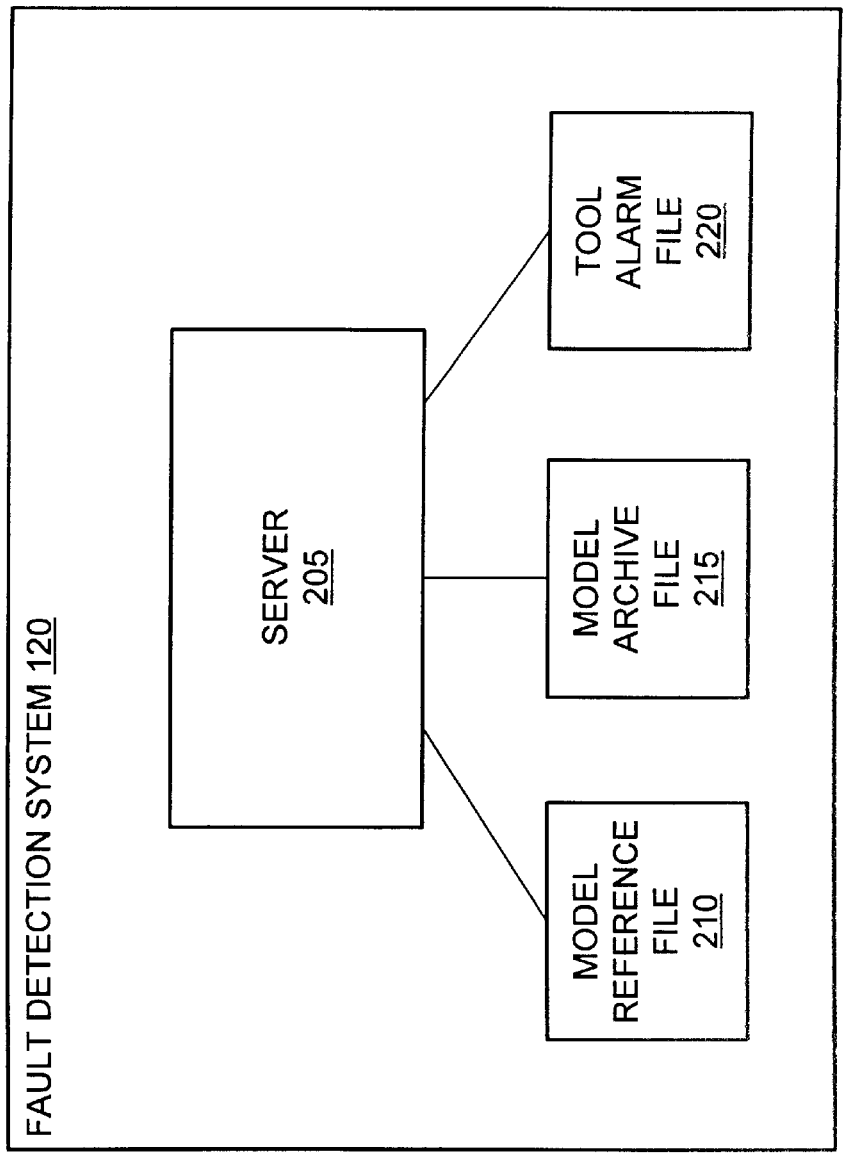
FIG. 2 depicts the detail of the fault detection system of FIG. 1.

Referring now to FIG. 2, a more detailed representation of the fault detection system 120 is provided. The fault detection system 120 receives the tool data files as converted from the data collection unit 130 at a server 205. In accordance with one embodiment, the server 205 runs ModelWare®, a commercially available software package that provides fault detection analysis of the processing tool 105 based upon the tool data files that are derived from the tool state data for each wafer processed by the tool 105. It will be appreciated, however, that other types of fault detection software may also be used in lieu of ModelWare® without departing from the spirit and scope of the present invention.

For each wafer processed by the tool 105, a model reference file (MRF) 210 is constructed from the tool data file that was forwarded from the data collection unit 130. The model reference file (MRF) 210 provides the current state of the tool 105 on a near real-time basis for each wafer that is being processed. When a lot of wafers is finished being processed by the tool 105, the model reference file (MRF) 210 for each wafer of the lot is compiled into a model archive file (MAF) 215 by the server 205. The server 205 also constructs a tool alarm file 220 by comparing the model reference file (MRF) 210 of the wafer currently being processed by the tool 105 to fault model data, provided that the data of the model reference file differs from the fault model data by a predetermined amount. The fault model data includes model reference files (MRFs) derived from the tool state data of other similar-type wafers, where it was previously known that such wafers that were processed by the tool within acceptable operational limits.

The types of faults that may be detected by the fault detection system 120 include processing and/or operational faults in silicon wafer fabrication. Examples of processing faults may include, but are not necessarily limited to, non-optimal preheating of the chamber, catastrophic failure where a broken wafer is detected, abnormal processed gas flow rate, temperature errors, temperature measurement drifts, etc. Some examples of operational faults detected by the fault detection system 120 may include interrupted/resumed processing, no wafer sleuth or improper wafer sleuth prior to Rapid Thermal Anneal (RTA), etc.

The fault detection system 120, upon evaluating the model reference file (MRF) 210 for the wafer currently being processed by the tool 105, sends the results of potential faults and/or proper operation of the tool 105 in the form of tool "health" data to the Advanced Process Control (APC) framework 135 (see FIGS. 1 and 2). The APC framework 135, in turn, may send control signals to the equipment interface 110 to control the processing tool 105 based upon the tool health data results forwarded from the fault detection system 120. For example, the signal sent from the APC framework 135 may be to shut down the tool 105 to prevent any additional faulty production of wafers. Data could also be sent from the APC framework 135 to inform a technician on how to rectify a faulty condition of the tool 105, if so desired. In accordance with another embodiment, the APC framework 135 may also forward a copy of the tool health data to the equipment interface 110, and the equipment interface 110 could forward the copy of the tool health data to the factory control system 125, which may average the tool health data and plot a chart of the data or averaged data for viewing by a fab technician.

Figure 3:
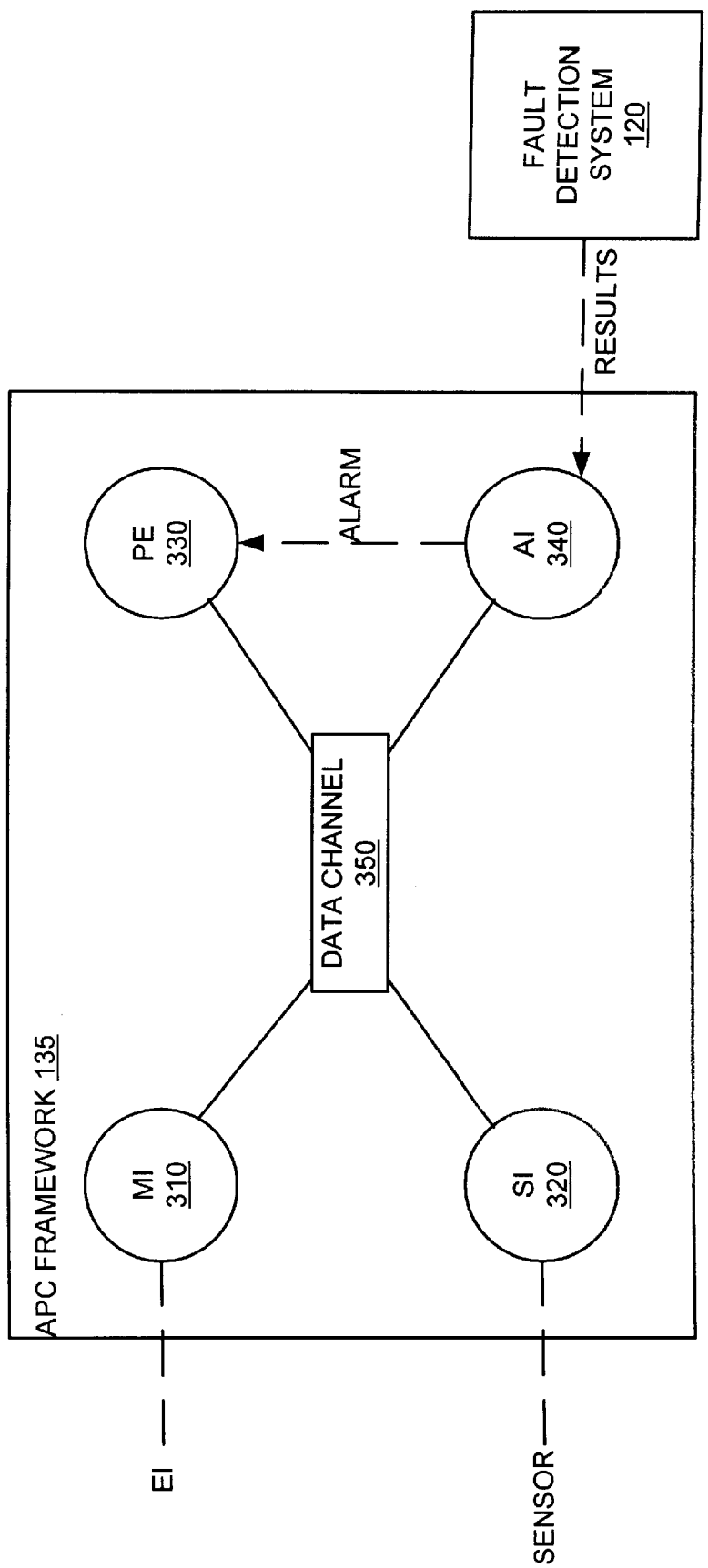
FIG. 3 shows a more detailed perspective of the APC framework of FIG. 1 for controlling the operation of the processing tool.

Turning now to FIG. 3, a more detailed representation of the APC framework 135 is provided. The APC framework 135 is a component-based architecture comprised of interchangeable, standardized software components enabling run-to-run control of the processing tool 105. The APC framework 135 includes a machine interface (MI) 310 for interfacing the tool 105 through the equipment interface 110 to the framework 135 for providing control of the tool 105. The APC framework 135 further includes a sensor interface (SI) 320 for interfacing the add-on sensor 115 with the framework 135. In accordance with one embodiment, the sensor interface 320 may be adapted to collect the tool state data of the processing tool 105 through the sensor 115 as opposed to having the data sent directly to the fault detection system 120. In this embodiment, the tool state data from the sensor 115 is sent to the fault detection system 120 via the APC framework 135. Furthermore, although only one sensor interface 320 is shown in FIG. 3, it will be appreciated that several sensor interfaces may be included within the framework 135 without departing from the spirit and scope of the present invention.

A plan executor (PE) 330 (i.e., a process controller) manages the APC framework 135 and provides possible solutions to problems found with the tool health data that was forwarded by the fault detection system 120. The framework 135 further includes an applications interface (AI) 340 for interfacing with third-party applications that run on the fault detection system 120. In the illustrated embodiment, the third-party application is the ModelWare software package running on the fault detection server 205. A data channel 350 is further provided to allow for communication between the machine and sensor interfaces 310, 320, the plan executor 330, and the applications interface 340 of the APC framework 135.

The machine interface 310 couples to the equipment interface 110 to serve as an interface between the processing tool 105 and the APC framework 135. The machine interface 310 supports the setup, activation, and monitoring of the tool 105. It receives commands and status events from the equipment interface 110 and forwards this information to other components of the APC framework 135, namely the plan executor 330 and applications interface 340. Any responses that are received by the machine interface 310 from the other components of the APC framework 135 are routed to the equipment interface 110 for delivery to the processing tool 105. As previously discussed, this may include a signal from the plan executor 330 to manipulate the tool 105 if a faulty condition is detected.

The machine interface 310 also reformats and restructures the messages between the specific communications protocol utilized by the equipment interface 110 and the Common Object Request Broker Architecture Interface Definition Language (CORBA IDL) communications protocol used by the components of the APC framework 135. The manner in which the machine interface 310 performs such translation between the equipment interface-specific communications protocol and the CORBA IDL protocol of the APC framework 135 is well known to those of ordinary skill in the art. Accordingly, the specific translation process between these two formats will not be discussed herein to avoid unnecessarily obscuring the present invention.

The sensor interface 320 serves as an interface between the add-on sensor 115 and the APC framework 135. The sensor interface 320 provides setup, activation, monitoring, and data collection for the add-on sensor 115. Similar to the machine interface 310, the sensor interface 320 also reformats and restructures the messages between the specific communications protocol utilized by the sensor 115 and the CORBA IDL protocol used by the components of the APC framework 135.

The applications interface 340 supports the integration of third-party tools (e.g., commercial software packages, such as ModelWare, MatLab, and Mathematica, for example) to the APC framework 135. Typically, these third-party tools do not provide the standard CORBA IDL protocol known to the APC framework 135. Accordingly, the applications interface 340 provides the necessary translation between the communications protocol utilized by the third-party tool and the CORBA protocol used by the APC framework 135. In the illustrated embodiment, the third-party tool is the fault detection system 120 for analyzing the tool state data of the processing tool 105 that is supplied via the data collection unit 130 and the sensor 115. As previously discussed, the fault detection system 120 includes ModelWare® software for providing fault detection in the illustrated embodiment.

The plan executor 330 performs a predetermined action based upon the tool health data results that are supplied by the fault detection system 120. When the applications interface 340 receives the results from the fault detection system 120, it forwards a copy of the results to the plan executor 330. Upon inspection of the results, the plan executor 330 attempts to rectify the fault condition found with the tool 105 by performing a predetermined action. In accordance with one embodiment of the present invention, the solution to a fault condition may be for the plan executor 330 to send a control signal to the machine interface 310 and equipment interface 110 to shut down the tool 105 so as to prevent further manufacturing of faulty silicon wafers. The plan executor 330, in addition to shutting down the tool 105, may also apprise a technician of any potential solutions to rectify the fault condition through an operator interface (not shown) such as a graphical user interface (GUI), for example, before the tool 105 may commence operation once again. Alternatively, the predetermined action performed by the plan executor 330 may be to forward a copy of the tool health data to the equipment interface 110, and then to forward the health data to the workstream 125.

Figure 4A:
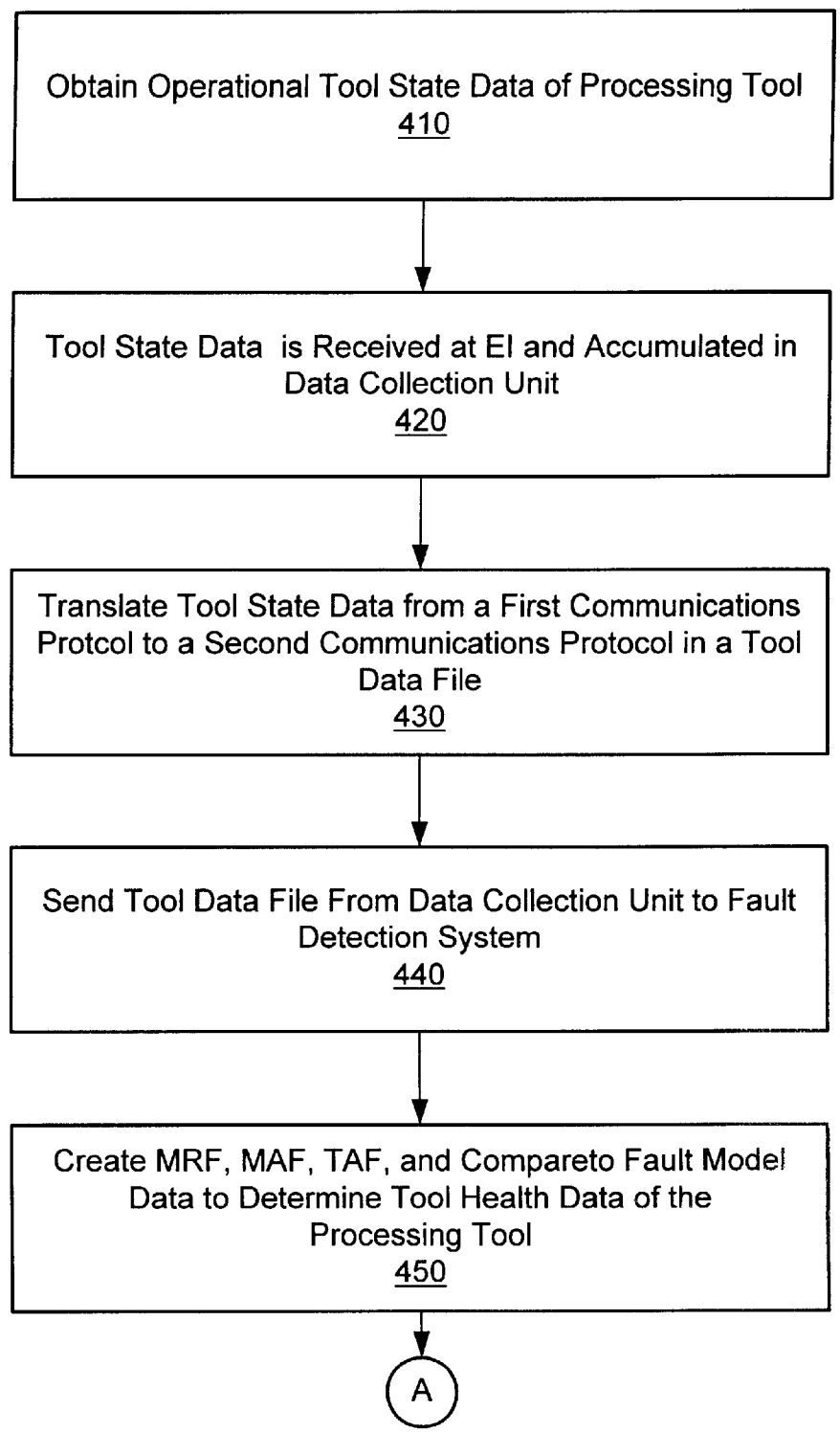
FIGS. 4A and B show a process for providing fault detection capability for the manufacturing system of FIG. 1 and control thereof.
Figure 4B:
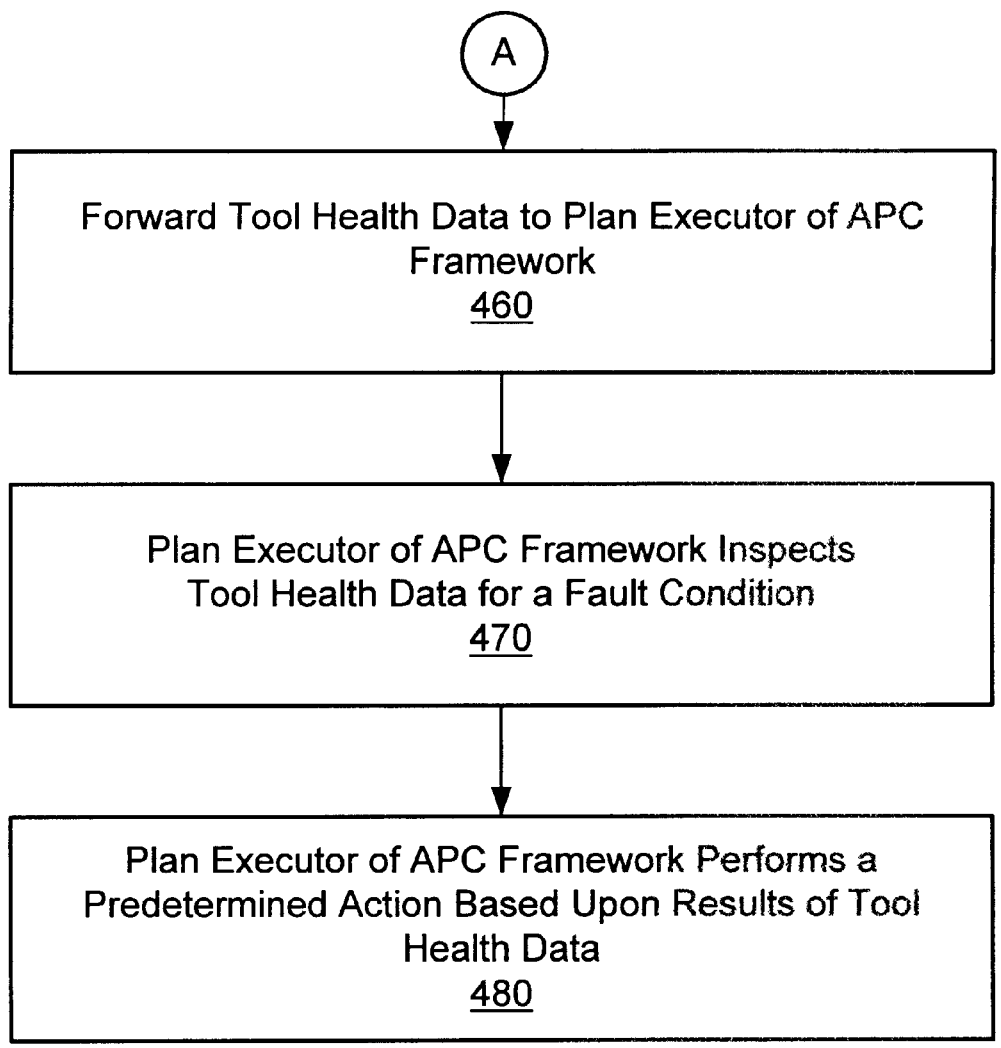

Turning now to FIGS. 4A and 4B, a process 400 for fault detection based upon tool state operational parameters is provided. The process 400 commences at block 410 where the tool state data of the processing tool 105 is obtained. The tool state data may be obtained from the tool 105 itself or through an add-on sensor 115. In accordance with one embodiment, the tool state data may include temperature, pressure, and gas flow measurements from the processing tool 105.

Once the tool state data is obtained through the processing tool 105, the data is received at the equipment interface 110, and is accumulated in the data collection unit 130 at block 420. At block 430, the data collection unit 130 converts the tool state data received for each wafer processed by the tool 105 from a first communications protocol used by the equipment interface 110 to a second communications protocol in the form of a tool data file. The data collection unit 130, when converting the tool state data into a tool data file, translates this data into the second communications protocol that is compatible with the software package running on the fault detection system 120, which is the ModelWare software package in the illustrated embodiment. Subsequent to creating the tool data file for each wafer currently being processed by the tool 105, the data collection unit 130 forwards the tool data file to the fault detection system 120 at block 440. The fault detection server 205 of the fault detection system 120 generates a model reference file 210, adds the model reference file (MRF) to the model archive file (MAF) 215 for the lot of wafers processed, and generates a tool alarm file 220 based on the tool data file received from the data collection unit 130. The fault detection server 205 further compares the model reference file 210 for the wafer currently being processed by the tool 105 to fault model data, and generates tool health data for the wafer at block 450.

At block 460, the fault detection system 120 forwards the tool health data to the plan executor 330 of the APC framework 135 via the applications interface 340. At block 470, the plan executor 330 inspects the tool health data for the particular wafer being processed by the tool 105. At block 480, the plan executor 330 performs a predetermined action based upon the inspection. In accordance with one embodiment, the predetermined action may be to send a control signal to shut down the processing tool 105 if the tool health data is deemed faulty. In an alternative embodiment, the plan executor 330 may forward the tool health data of the tool 105 to the equipment interface 110. The equipment interface 110 would then forward the tool health data to the workstream 125, where the tool health data may be averaged and plotted on a chart for viewing by a fab technician, if so desired.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method comprising:

receiving at a first interface operational state data of a processing tool related to the manufacture of a processing piece;

sending the state data from the first interface to a fault detection unit, wherein the act of sending comprises:

sending the state data from the first interface to a data collection unit;

accumulating the state data at the data collection unit;

translating the state data from a first communications protocol to a second communications protocol compatible with the fault detection unit; and sending the translated state data from the data collection unit to the fault detection unit;

determining if a fault condition exists with the processing tool based upon the state data received by the fault detection unit;

performing a predetermined action on the processing tool in response to the presence of a fault condition; and sending an alarm signal indicative of the fault condition to an advanced process control framework from the fault detection unit providing that a fault condition of the processing tool was determined by the fault detection unit, wherein performing a predetermined action further comprises sending a signal by the framework to the first interface reflective of the predetermined action.

2. The method of claim 1, wherein performing a predetermined action further comprises:

shutting down the processing tool providing that a faulty condition exists.

3. The method of claim 1, further comprising:

receiving additional state data of the processing tool from a sensor that is coupled to the processing tool; and sending the additional state data to the fault detection unit.

4. The method of claim 3, further comprising:

translating the state data from the sensor from a first communications protocol used by the sensor to a second communications protocol used by the fault detection unit.

5. The method of claim 1, wherein determining if the fault condition exists, further comprises:

comparing the state data received at the first interface to predetermined state data at the fault detection unit.

6. The method of claim 5, wherein comparing comprises comparing the state data received to fault model data that is derived from other similar-type wafers, where it was previously known that such wafers were processed within acceptable operational limits.

7. The method of claim 1, wherein sending the accumulated state data from the data collection unit to the fault detection unit, further comprises:

sending the accumulated state data from the data collection unit to the fault detection unit while a processing piece is being processed by the tool.

8. A system comprising:

a processing tool adapted to manufacture a processing piece;

a first interface, coupled to the processing tool, the first interface adapted to receive operational state data of the processing tool related to the manufacture of the processing piece;

a fault detection unit adapted to determine if a fault condition exists with the processing tool based on said operational state data;

a framework adapted to perform a predetermined action on the processing tool in response to the presence of a fault condition;

wherein the first interface comprises a data collection unit adapted to receive and accumulate the state data as the data is received by the first interface, translate the state data from a first communications protocol to a second communications protocol compatible with the fault detection unit, and to send the translated state data from the data collection unit to the fault detection unit;

wherein the fault detection unit is further adapted to send an alarm signal indicative of the fault condition to the framework from the fault detection unit providing that a fault condition of the processing tool was determined by the fault detection unit; and wherein the framework is further adapted to send a control signal to the first interface reflective of the predetermined action providing that a fault condition exists.

9. The system of claim 8, further comprising:

a sensor, coupled to the processing tool, the sensor adapted to receive additional state data from the processing tool, and to send the data to the fault detection unit.

10. The system of claim 8, wherein the fault detection unit is further adapted to compare the state data of the processing tool to predetermined state data to determine the presence of the fault condition.

11. The system of claim 10, wherein the fault detection unit is adapted to compare the state data received to fault model data that is derived from other similar-type wafers, where it was previously known that such wafers were processed within acceptable operational limits.

12. The system of claim 8, wherein the predetermined action is to shut down the processing tool.

13. The system of claim 8, wherein the data collection unit is further adapted to send the accumulated state data to the fault detection unit while a processing piece is being processed by the tool.

14. The system of claim 8, wherein the processing tool is a semiconductor fabrication tool, and the processing piece is a silicon wafer.

15. An apparatus, comprising:

an interface adapted to receive operational state data from a processing tool and to provide the operational state data;

a controller adapted to:

receive the operational state data from the interface;

determine if a fault condition exists with the processing tool based on the operational state data received from the interface; and perform a corrective action on the processing tool in response to the presence of a fault condition, wherein the controller is adapted to perform the predetermined action comprises the controller adapted to send a signal to the interface reflective of the predetermined action.

16. The apparatus of claim 15, wherein the controller is adapted to shutdown the processing tool in response to the presence of the fault condition.

17. The apparatus of claim 15, wherein the controller is adapted to compare at least a portion of the operational data to model data to determine if a fault condition exists.

* * * * *